United States Patent Office 3,102,282
Patented Sept. 3, 1963

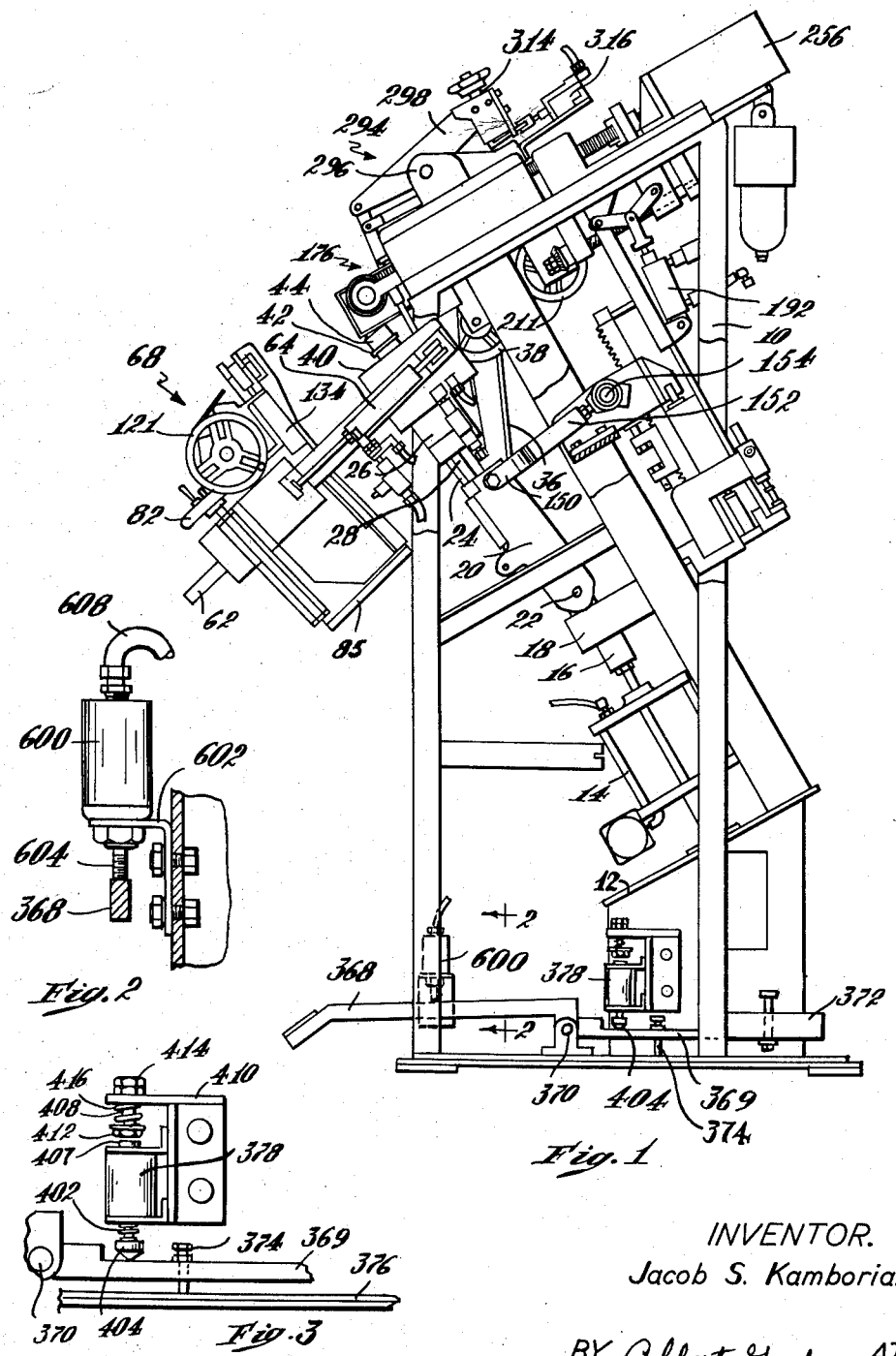

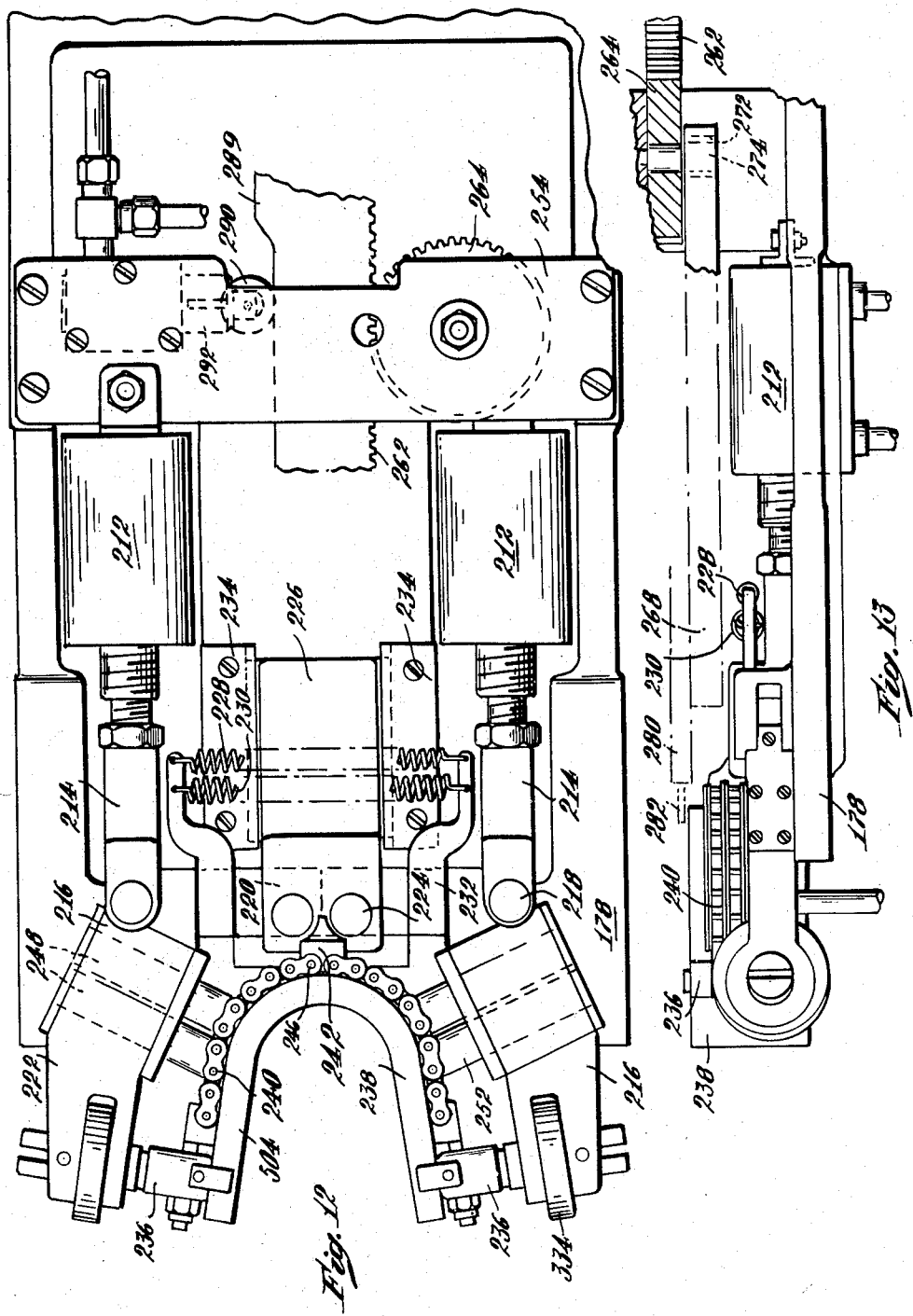

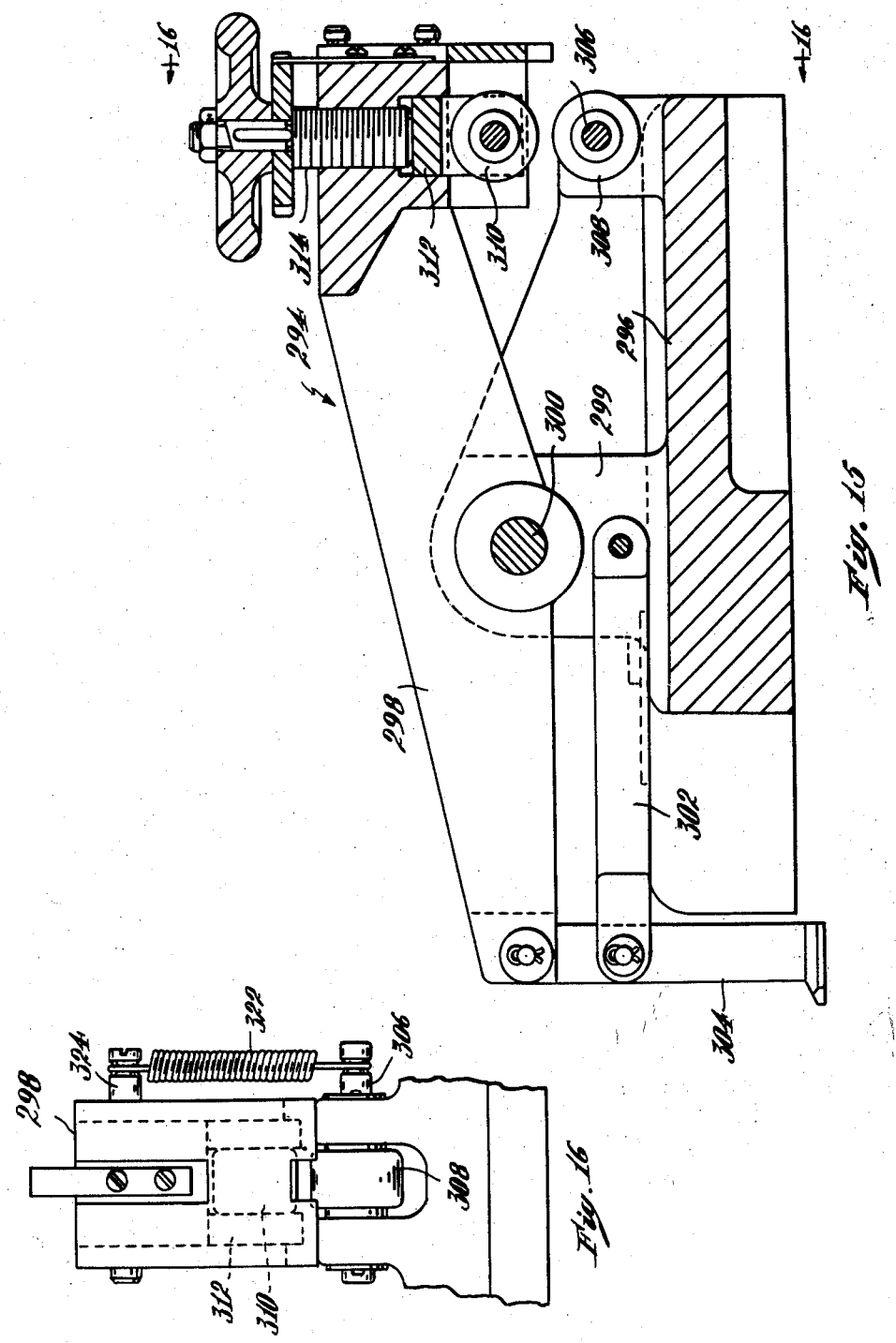

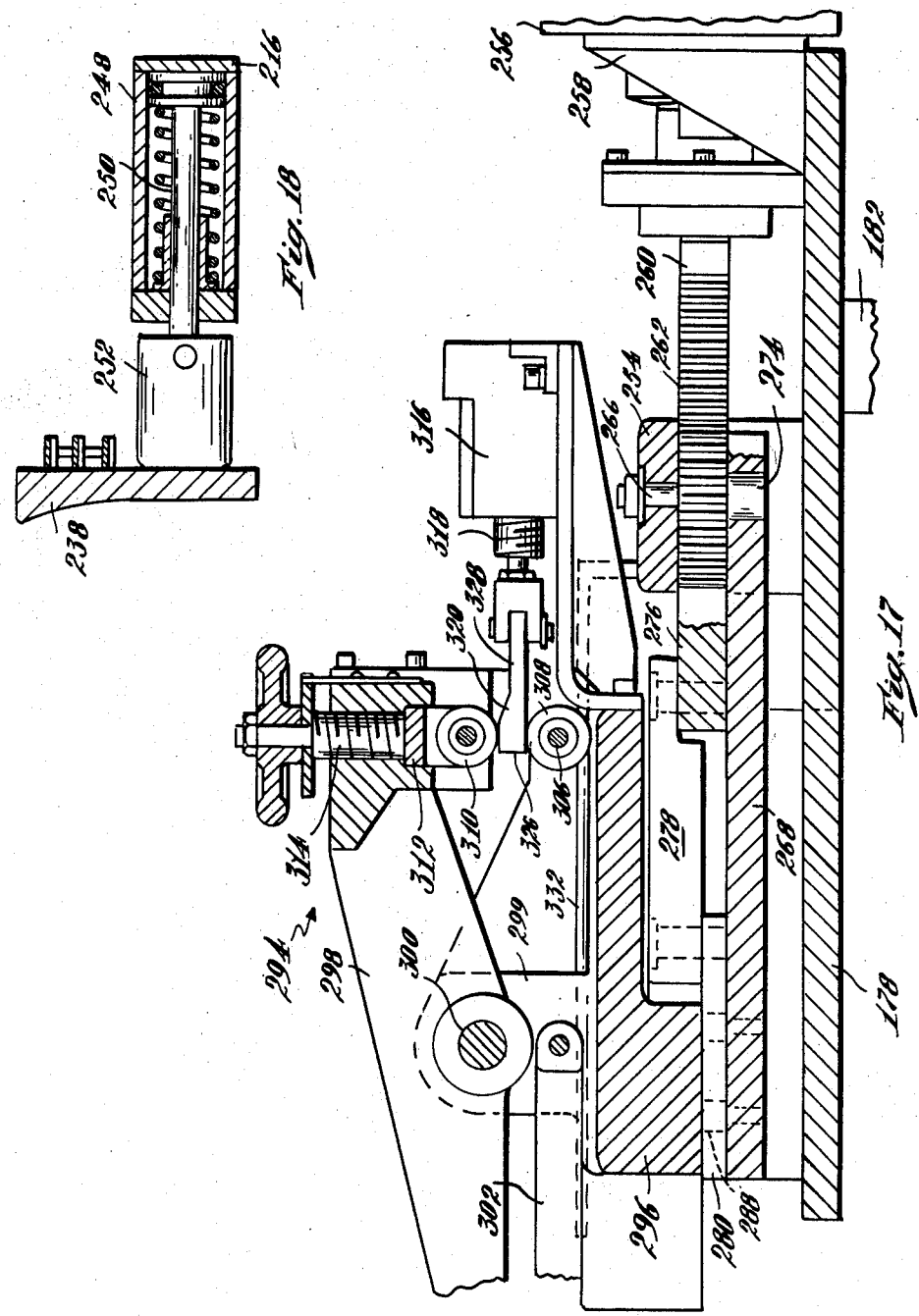

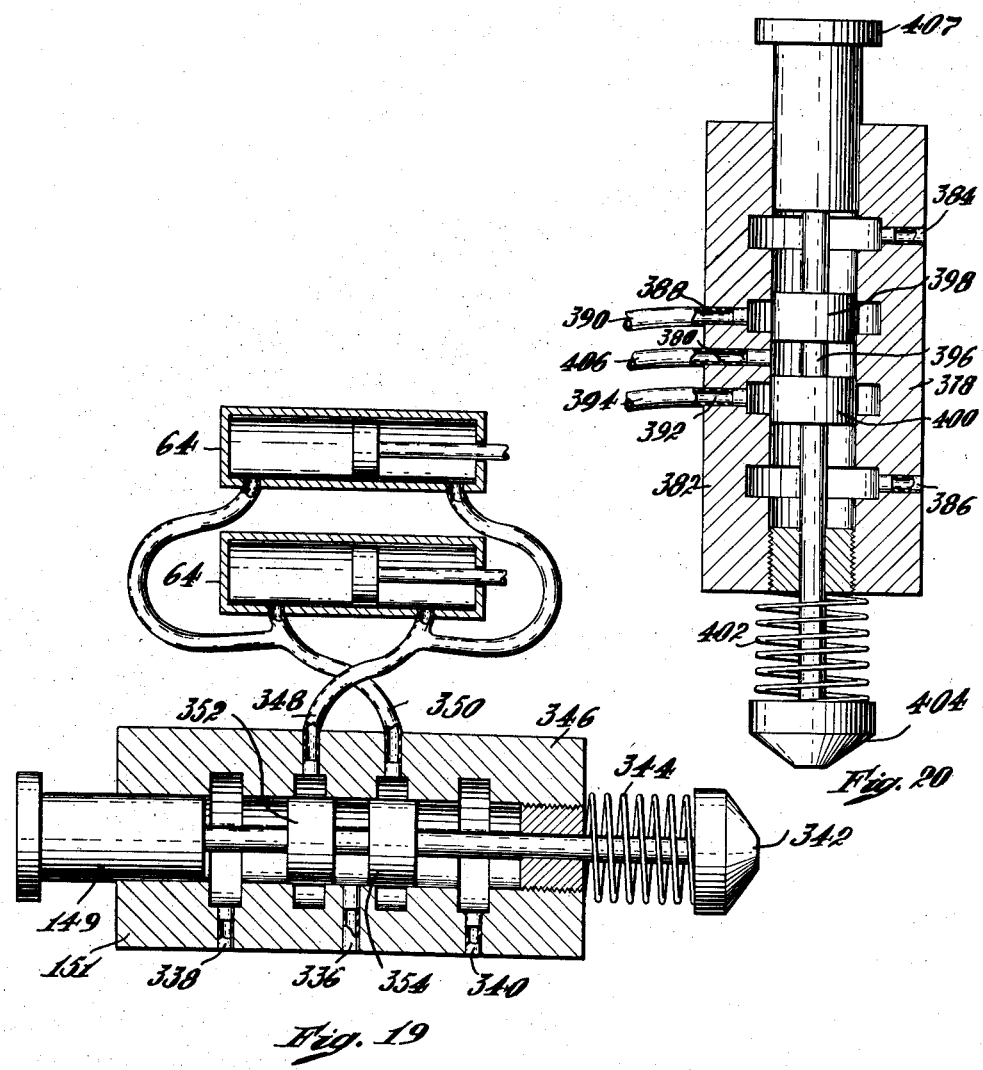

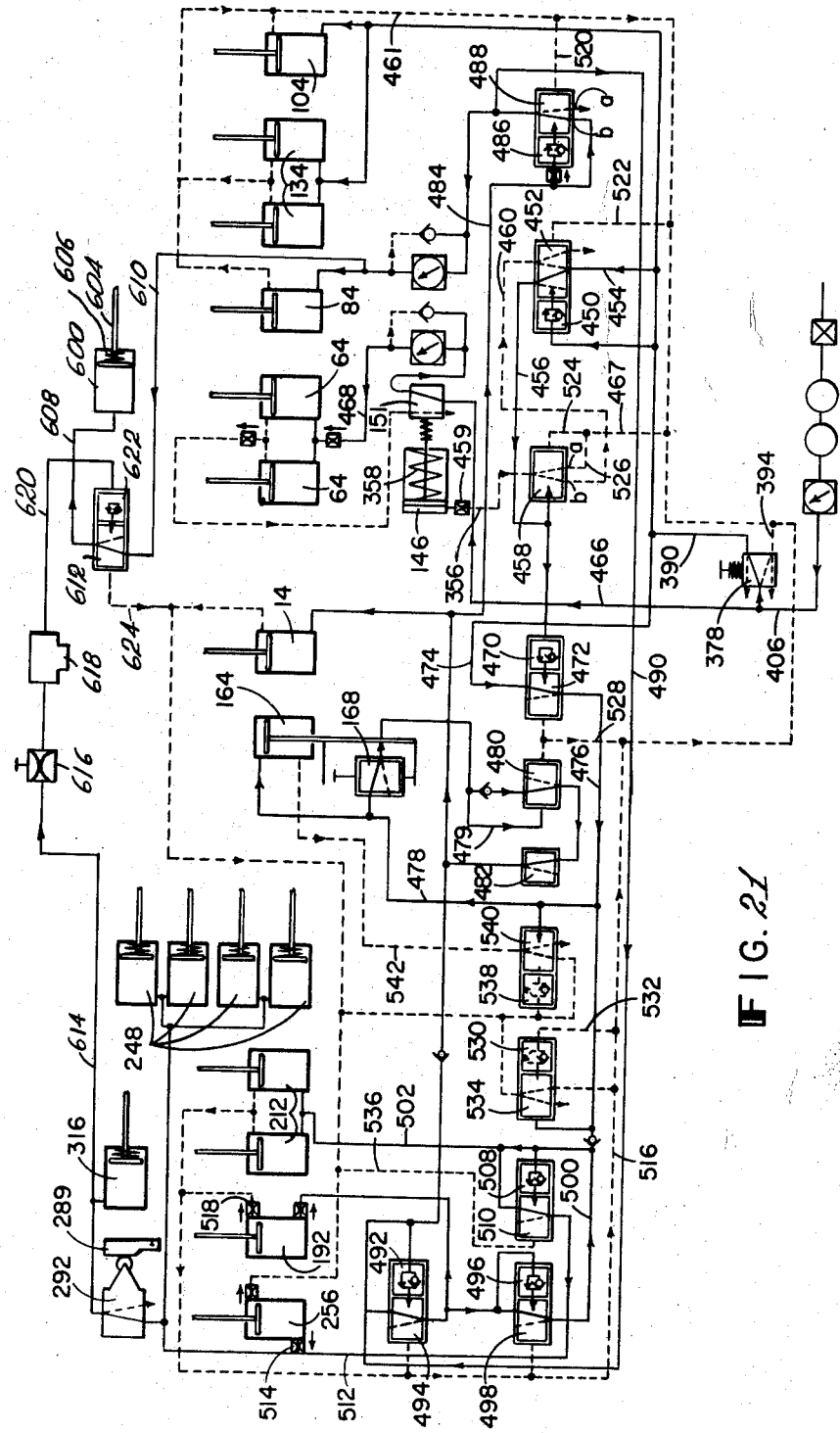

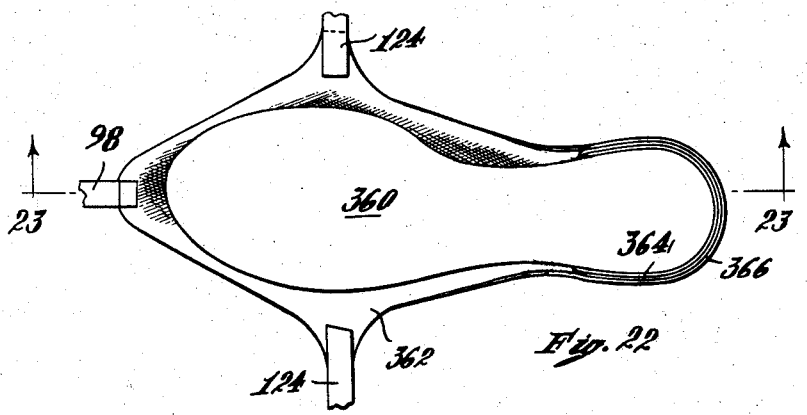
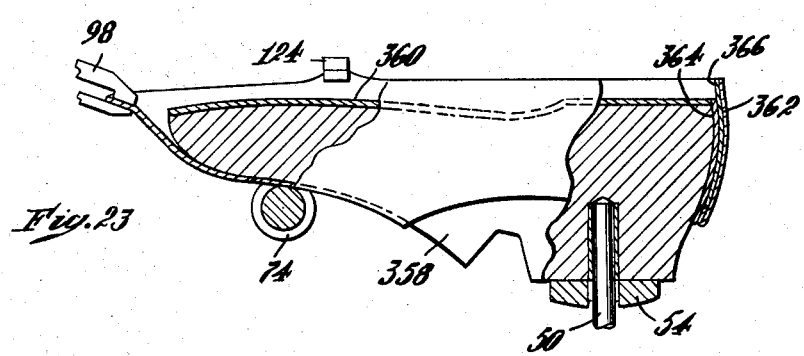
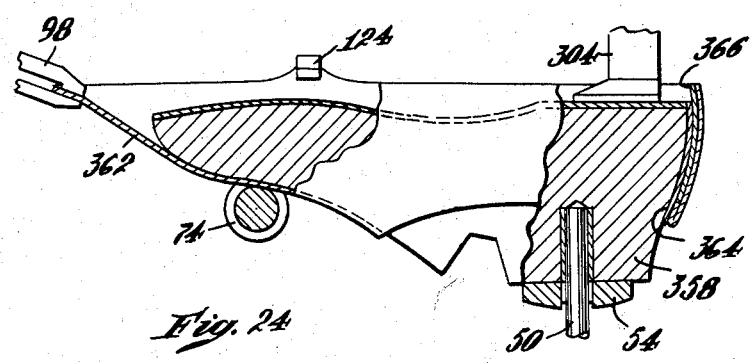

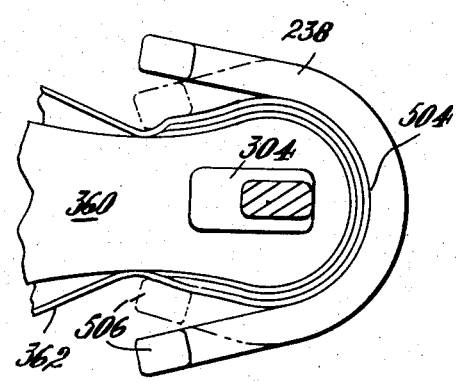
Fig. 25
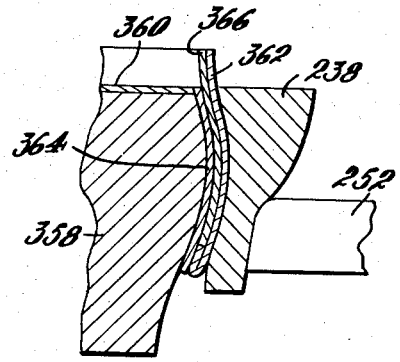
Fig. 26
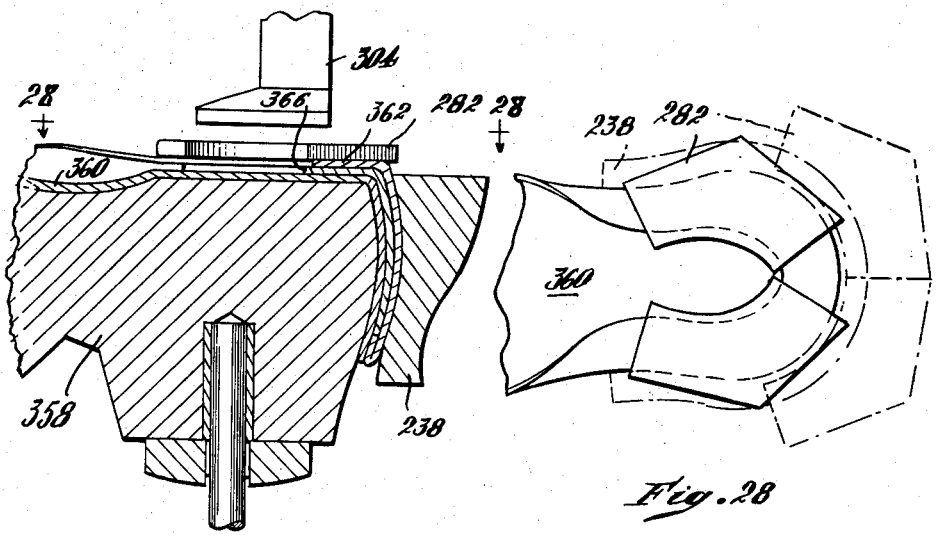
Fig. 27
Fig. 28

3,102,282
CONTROL FOR PULLING-OVER AND HEEL SEAT LASTING MACHINE
Jacob S. Kamborian, 133 Forest Ave., West Newton, Mass.
Filed Oct. 9, 1961, Ser. No. 143,633
25 Claims. (Cl. 12—10.5)

This invention relates to machines for operating on shoes and, in particular, to improvements in the control means of the machine shown in application Serial No. 107,156, filed May 2, 1961.

The aforesaid machine is designed to apply pulling-over forces to the toe and forepart portions of an upper to stretch it tightly on a last, mold the heel end and counter to the heel end of the last, clamp the upper to the heel end, stress the lasting margin heightwise, wipe the lasting margin of the upper and counter inwardly against the insole, and adhesively attach the margins to the insole. The several instrumentalities for performing the foregoing operation are supplied with a working fluid so as to operate in a predetermined sequence by shifting of an operator-actuated control valve from a position venting the control system through a neutral position to a working position. In the aforesaid machine, the control valve is normally held in venting position and a treadle is provided for moving it through the neutral position to the working position. The control valve is held in its working position throughout the cycle by the treadle. The control valve, at any time during the cycle of operation, may be moved from its working position to its neutral position by partial release of the treadle to stop the machine at a given phase of its cycle of operation to permit inspection, or may be moved to its venting position by completely releasing the treadle to restore the machine to its initial condition.

The principal object of this invention is to provide an improved control whereby the control valve, after it is moved to its working position to initiate operation of the cycle, may, during the early part of the cycle as in the prior machine, be moved to a neutral position or to a venting position, but, in contrast thereto, at a predetermined phase of the cycle of operation after the operation is once initiated, to prevent the control valve from being moved away from its working position until the cycle is completed.

The invention will now be described in greater detail with reference to the accompanying drawings wherein:

FIG. 1 is a side elevation of the machine, showing the treadle hold-down for improved control;

FIG. 2 is an elevation taken on the line 2—2 of FIG. 1;

FIG. 3 is an elevation of the treadle and pilot valve employed to control the operation of the machine;

FIG. 12 is a plan view of the heel-clamping means;

FIG. 13 is a side elevation of the heel-clamping means;

FIG. 15 is a side elevation of the hold-down unit;

FIG. 16 is a view taken along the line 16—16 of FIG. 15;

FIG. 17 is a detail, partly in section, of the heel seat lasting unit and the hold-down unit;

FIG. 18 is a detail of an auxiliary presser unit;

FIG. 19 is a schematic representation of a pilot valve and the motors for moving the upper tensioning unit;

FIG. 20 is a section of the pilot valve shown in FIG. 3;

FIG. 21 is a schematic representation of the air control system of the machine;

FIG. 22 is a plain view of the shoe and last after they have been placed in the machine and the upper has been gripped by the front and side pincers;

FIG. 23 is a view taken on the line 23—23 of FIG. 22;

FIG. 24 is a showing of the shoe and last after the shoe has been brought to bear against the hold-down foot;

FIG. 25 is a plan view of the shoe as it is about to be clamped by the heel-clamping pad;

FIG. 26 is a section showing the shoe after it has been clamped by the heel-clamping pad;

FIG. 27 is an elevation in section showing the heel portion of the shoe and last at the completion of the machine cycle; and FIG. 28 is a view taken on the line 28—28 of FIG. 27.

Figure 4:
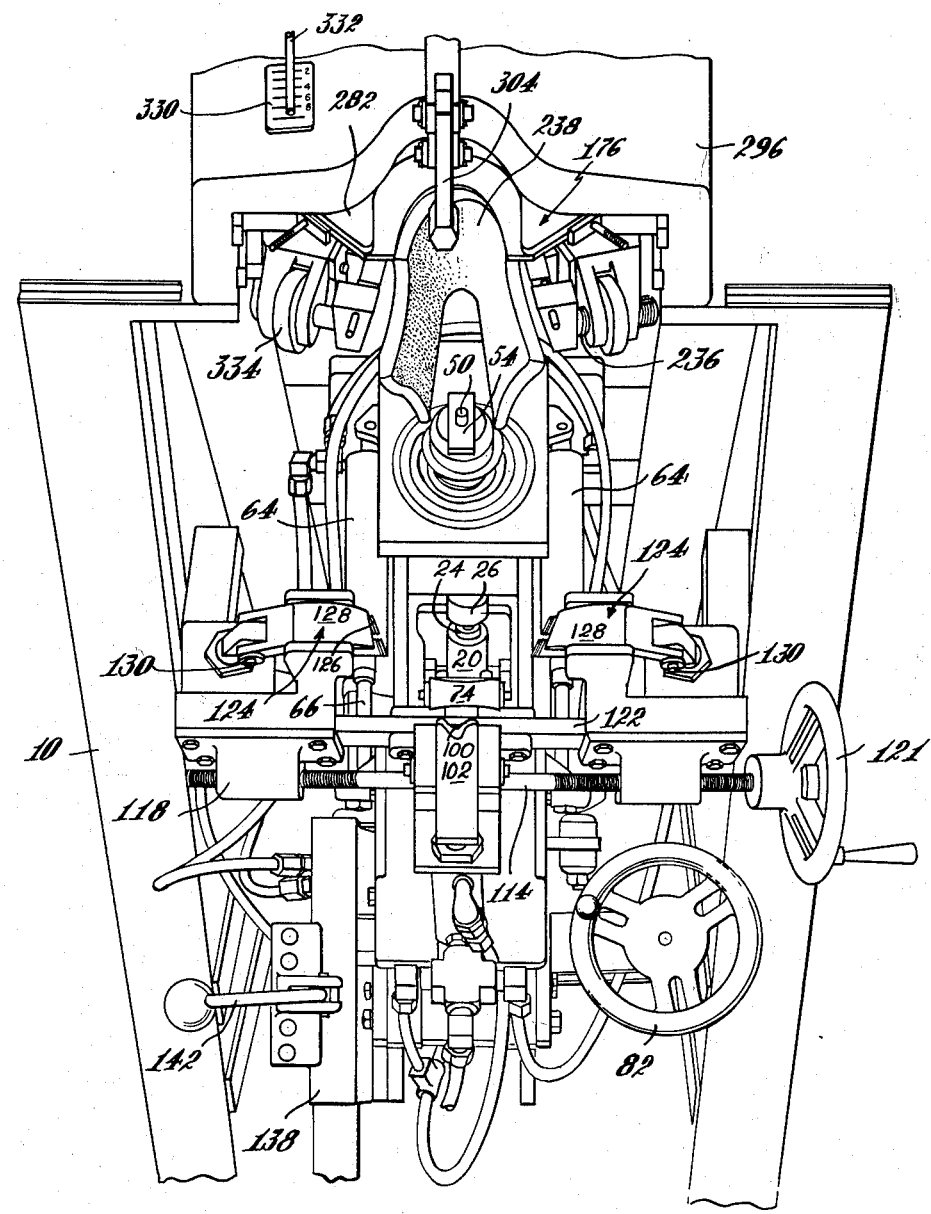
FIG. 4 is a partial front elevation of the machine.

Referring to FIGS. 1 and 4, the machine comprises a frame 10 supporting near its base an inclined plate 12. An air-actuator motor 14 (FIG. 1) is mounted on the plate 12 and has a piston rod 16 extending upwardly therefrom, that is vertically guided in a guide bearing 18 secured to the frame. A post 20 is pivotally secured to the piston rod 16 by a pivot 22. A rod 24 is disposed in a socket at the upper end of the post 20. The rod 24 has a collar 26 slidable thereon, which is adjustable axially of the rod by a screw 28, rotation of which is effected by means including a chain 36 and wheel 38. A swivel block 40 is pivotally mounted on the rod with its bottom side resting on the collar 26 and retained thereon by a snap ring 42. Thus, raising and lowering the collar 26 also raises and lowers the block 40.

A last-supporting plate 54 and a last pin 50 are mounted at the upper end of the post on a holder 44.

The swivel block 40 has a groove 60 (FIG. 6) on each side thereof, and parallel bars 62 are rigidly mounted in each groove 60 to extend forwardly of the block 40. An air-operated motor 64 is pivotally connected to each bar 62 to extend forwardly of the block 40. The piston rods 66 (FIG. 6) of the motors 64 are rigidly connected to a head 67 forming part of an upper tensioning unit 68 that is slidably mounted on the bars 62.

The unit 68 supports, at its forward end, a toe rest roller 74 for adjustment heightwise thereon.

An air-operated motor 84 (FIG. 5), mounted on the unit 68 is connected by a piston rod (not shown) to a T-bar 88 that is slidably mounted for up-and-down movement in the unit 68. At the top of the upright limb 90 of the T-bar there is mounted a front pincers bracket 92. The bracket 92 has a pair of upright slots 94 which receive studs 96 that are threaded into the T-bar 88 to thereby adjustably mount the bracket 92 on the T-bar. A pincers 98 is mounted on the bracket 92. The pincers 98 comprises a stationary pincers jaw 100 rigidly connected to the bracket 92 and a movable pincers jaw 102 swingably mounted on the bracket 92. The jaw 102 is normally open and an air-operated motor 104, mounted on the bracket 92, is provided for closing it. A shaft 114 having right and left-hand threads at its opposite ends is mounted on the bracket 92. The threaded portions of the screw are screwed into bosses 118 that are secured to side pincers brackets 120. A wheel 121 is secured to one of the ends of the shaft 114. The brackets 120, which are slidably mounted on the prone legs 122 of the T-bar 88, support side pincers 124. Each side pincers 124 comprises a fixed jaw 126 rigidly connected to a bracket 120 and a movable jaw 128 pivotally mounted on a bracket 120 by a pivot 130 and pivotally connected to the piston rod 132 of an air-operated motor 134 that is secured to an extension 136 on each bracket 120.

Figure 5:
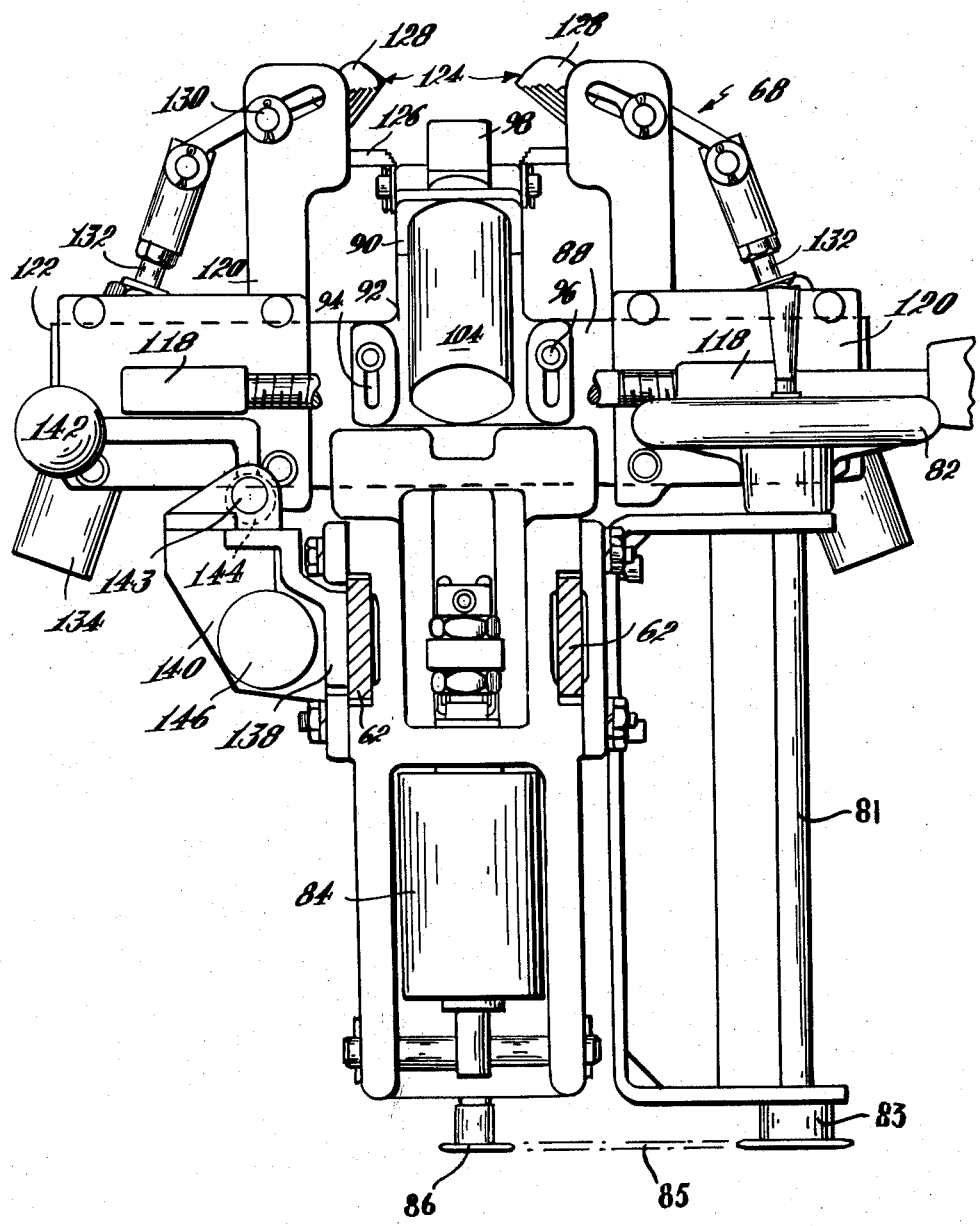
FIG. 5 is a front view of the upper tensioning unit.

A shelf 138 is secured to one of the bars 62 (FIG. 5). A bracket 140 is slidably mounted on the shelf 138 and can be locked in a desired position on the shelf by swinging a handle 142 that is pivoted to the bracket 140 by a rod 143 that is rigidly connected to the handle and pivotally mounted in the bracket. The handle includes a cam 144 whose center is eccentric with respect to the rod 143 and thereby engages the shelf 138 to lock the bracket 140 in place upon swinging of the handle. The bracket 140 has a spring-return, air-operated pilot motor 146 mounted thereon. The piston rod 148 of the motor 146 is engageable with the valve spool 149 of a pilot valve 151 mounted on the upper tensioning unit 68.

Figure 7:
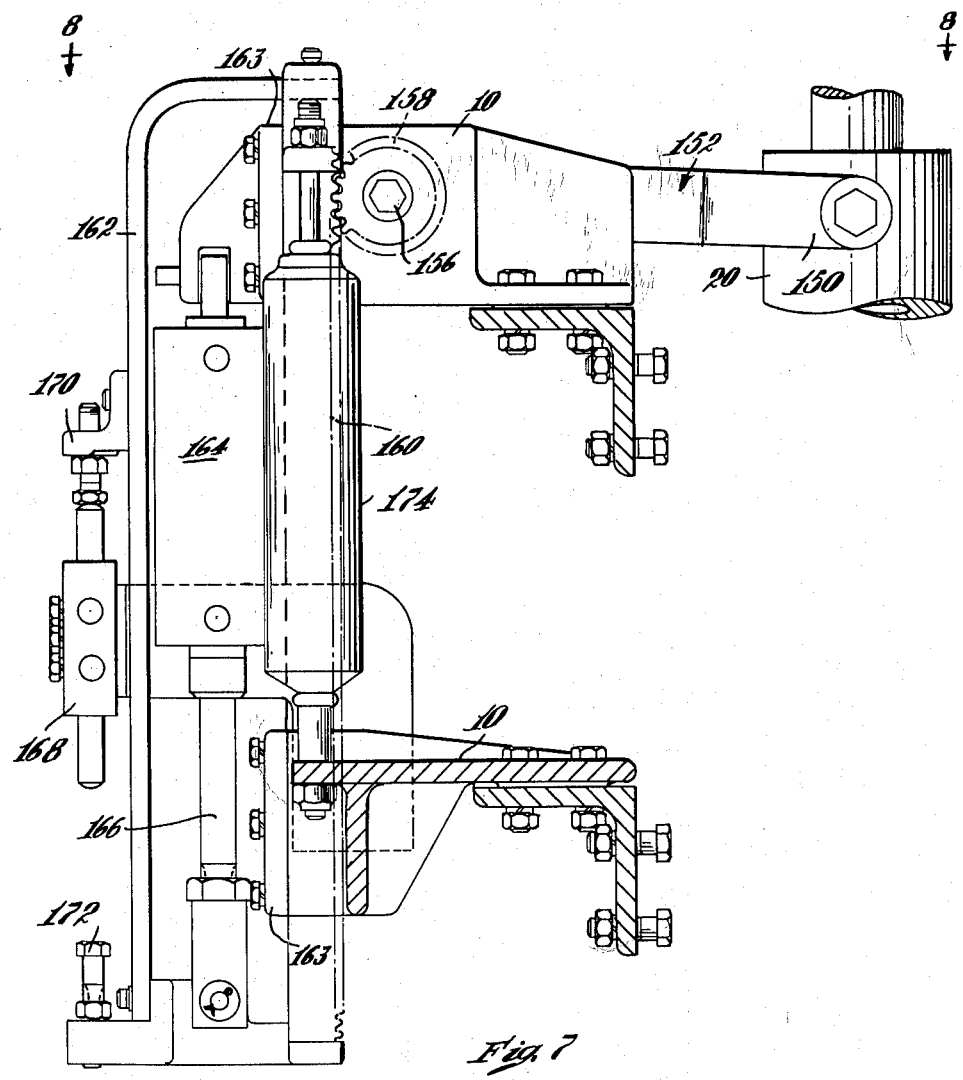
FIG. 7 is a view of the mechanism for swinging the last-supporting post.
Figure 8:
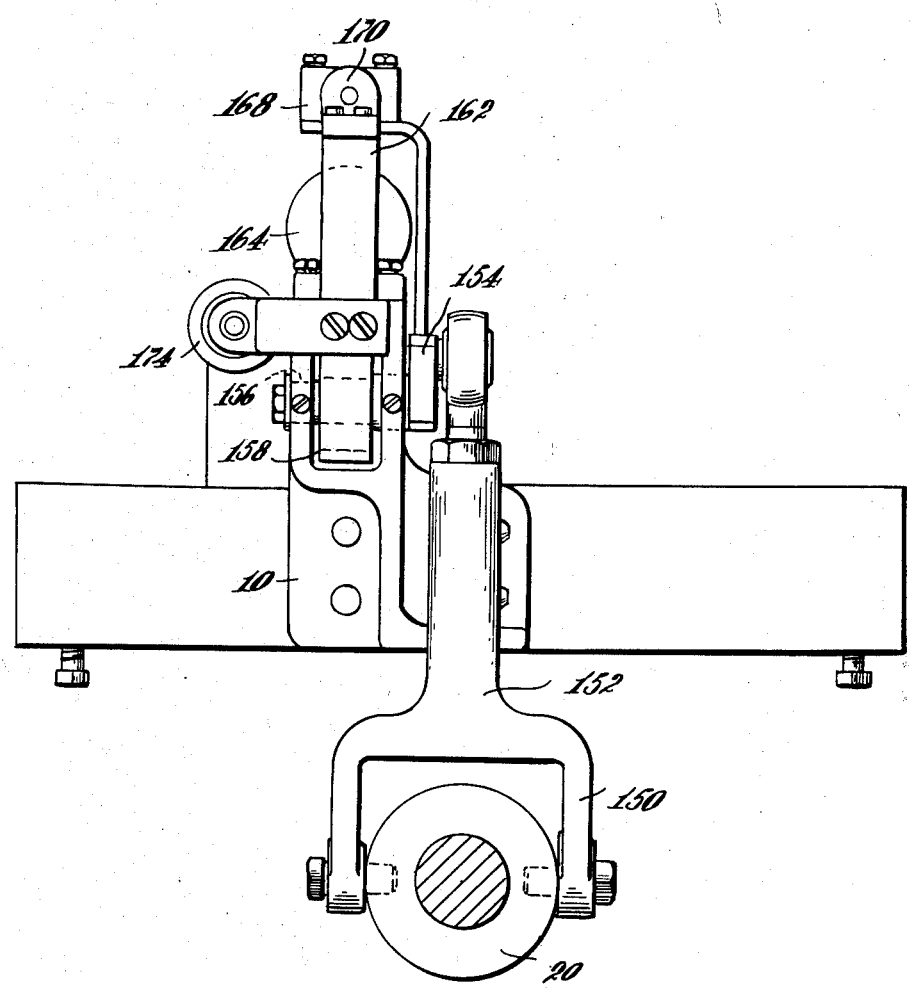
FIG. 8 is a view taken along the line 8—8 of FIG. 7.
Figure 10:
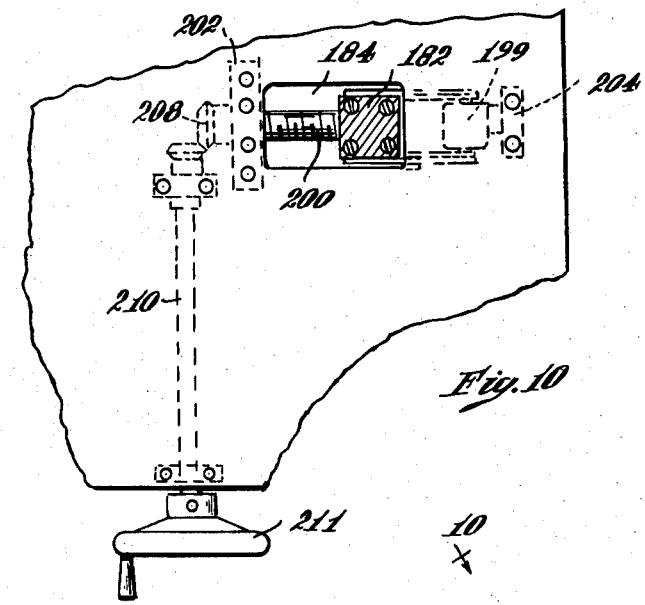
FIG. 10 is a view taken along the line 10—10 of FIG. 9.

The post 20 is pivotally connected to the legs 150 of a forked pitman 152 that straddles the post (FIGS. 7 and 8). The pitman 152 is pivotally and eccentrically connected to a crank 154. The crank 154 is connected to a shaft 156 which, in turn, is pivotally mounted in the frame 10. The shaft 156 has a gear 158 secured thereto that is in mesh with a rack 160 mounted on a D-shaped rack support 162, the rack being slidably guided in gibs 163 located in the frame 10. An air-operated motor 164, mounted in the frame 10, has a piston rod 166 connected to the rack frame 162 to effect the vertical movement of the rack 160 and hence swinging movement of the post 20 about the pivot 22. A valve 168 (FIG. 7) is mounted in the frame 10 and has a valve spool engageable by lugs 170 and 172 at either extremity of movement of the rack frame 162, the lugs being adjustably mounted in the rack frame. A shock absorber 174 is interposed between the frame 10 and the rack 160 to eliminate chattering and ensure a smooth operation when the rack is caused to move upwardly or downwardly in the frame.

Figure 11:
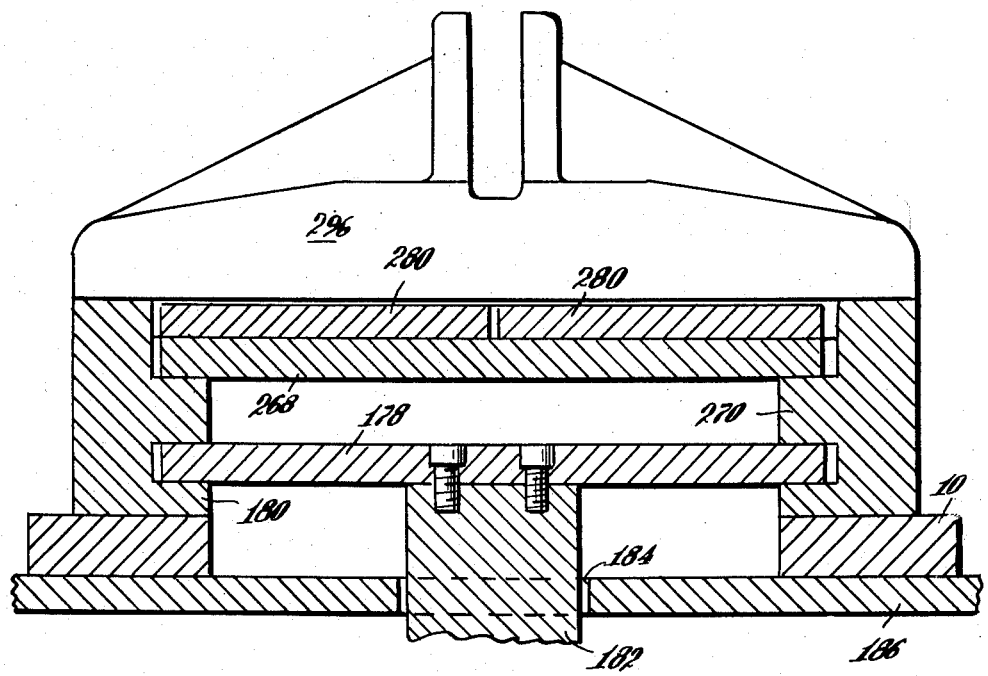
FIG. 11 is a vertical section through the heel seat lasting unit.

A heel seat lasting unit 176 (FIG. 1) is mounted in the frame 10 rearwardly of the upper tensioning unit 68. Referring to FIGS. 9 through 13, the unit 176 comprises a main slide plate 178 slidably mounted for forward and rearward movement on gibs 180 in the frame 10 (FIG. 11). A block 182 is secured to plate 178 and is slidable in a slot 184 formed in a table 186, which table forms a part of the frame 10. A floating actuator 188 (FIG. 9) is secured to the block 182. The actuator 188 comprises a bar 190 depending from and rigid with the block 182. An air-operated motor 192 is pivoted to the bar 190 and has a piston rod 194 extending upwardly therefrom. A pair of toggle links 196 and 198 are pivoted at their adjoining ends to the piston rod 194 and are respectively pivoted at their opposite ends to the bar 190 and a block 199 taking the form of a nut. A screw 200 is rotatably mounted in hangers 202 and 204 depending from the table 186, extends through a clearance opening 206 in the bar 190 and is threaded into the nut 199. The screw 200 is connected through a gear train 208 (FIG. 10) and a shaft 210 to a wheel 211. Thus, rotation of the wheel 211 causes the nut 199 to move axially of the screw 200 and causes the floating actuator 188, the block 182, the main slide plate 178 and the members carried thereby to move forwardly and rearwardly in the frame. Actuation of the motor 192 to open or close the toggle linkage formed by the members 194, 196 and 198 will also cause the main slide plate 178 and the members carried thereby to move forwardly and rearwardly in the frame.

A pair of air-actuated motors 212 (FIGS. 12 and 13) are mounted on the plate 178. Each motor 212 has a piston rod 214 that is pivotally connected to a lever 216 by a pivot 218. The levers 216 have legs 220 extending toward each other from the pivots 218 and legs 222 extending forwardly and divergently from the pivots 218. The legs 220 are pivotally connected by pivots 224 to a slide 226. A pair of tension springs 228 and 230 are connected at their opposite ends to arms 232 that are fixed to the legs 220. The springs force the levers 216 about the pivots 218 to the position shown in FIG. 12 where the contiguous faces of the legs 220 abut each other. The slide 226 is slidably mounted in gibs 234 mounted on the plate 178. The lever legs 222 have studs 236 adjustably mounted in their extremities and the studs 236 are affixed to the ends of a U-shaped heel-clamping pad 238 made of a flexible material such as leather. A pair of sprocket chains 240 are wrapped around the outer periphery of the pad 238. Each chain 240 is anchored at one end to a stud 236. The slide 226 has a projection 242 at its forward end (FIG. 12), having a slot (not shown) in which the other end of each chain 240 is received. A pair of pins 246 mounted in the projection 242 extend across the slot and through the ends of the chains 240 remote from the studs 236. A pair of spring-return, air-actuated motors 248 are mounted in each of the lever legs 222 (FIGS. 12 and 13). The motors 248 have pistons 250 extending toward the pad 238 below the chains 240. A presser member 252 is affixed to each piston 250.

Figure 14:
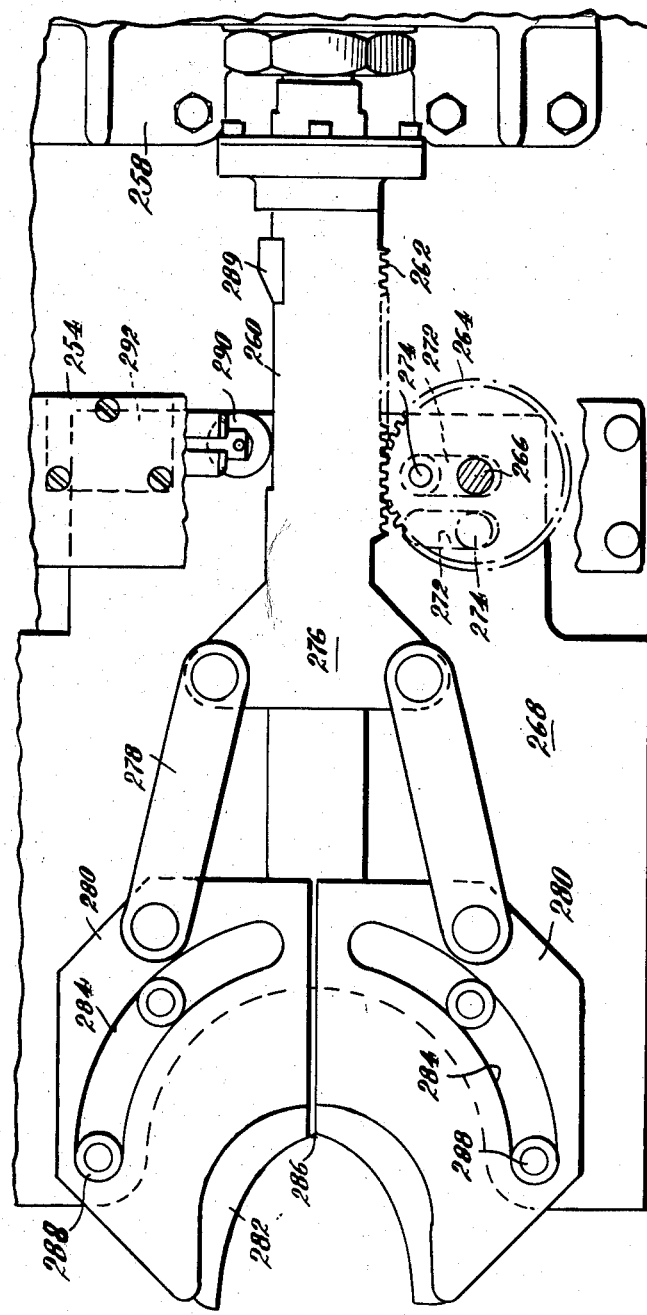
FIG. 14 is a plan view of the wiping means.

A bridge 254 is anchored at its ends to the sides of the main slide plate 178 and extends thereover. An air-operated motor 256 (FIG. 17) is secured to a rib 258 at the rear of the main slide plate 178. The piston rod 260 of the motor 256 has a rack 262 thereon that is in mesh with a gear 264 (FIG. 14), rotatably mounted beneath the bridge 254 on a pin 266 fixed in the bridge. A wiper supporting slide plate 268 is slidably supported on gibs 270 in the frame (FIGS. 11 and 14). The plate 268 has a slot 272 extending transverse to the rack 262 which receives an eccentrically mounted crank pin 274 depending from the gear 264. The piston rod 260 has an enlargement 276 to which are pivoted the ends of links 278. The opposite ends of the links 278 are pivoted to wiper cams 280 and a wiper 282 is mounted in each wiper cam. The wiper cams 280 have curved cam slots 284 with a center of curvature at the point where the wipers diverge from each other, indicated by numeral 286 in FIG. 14. The wiper cams rest on the plate 268 and the plate has rollers 288 extending upwardly therefrom into the cam slots 284. A valve actuating lug 289, mounted on the piston rod 260, is engageable with the valve spool 290 of a valve 292 that depends from the bridge 254.

A hold-down unit 294 (FIGS. 1, 15 and 17) is mounted on a frame cover 296 located above the plates 178 and 268 and the wiper cams 280. The unit 294 comprises a lever 298 pivoted to a clevis 299 on the cover 296 by a pivot 300. A link 302 is pivoted to the cover 296 below the pivot 300 and both the lever 298 and the link 302 are pivotally connected to a hold-down foot 304. The lever 298, link 302 and foot 304 thus form a parallel linkage mechanism whereby counterclockwise movement of the lever (FIG. 15) imparts a substantially rectilinear downward movement to the foot 304 and clockwise movement of the lever 298 imparts a substantially rectilinear upward movement to the foot 304.

A pin 306 is rotatably mounted in the cover 296 rearwardly of the pivot 300 and a roller 308 is affixed to the pin 306. A roller 310 is rotatably mounted in a clevis 312 that is slidably mounted for up-and-down movement at the rear end of the lever 298 opposite the roller 308. A screw 314 bears against the upper surface of the clevis 312 to limit the upward movement of the clevis 312 in the lever 298.

An air-operated spring return motor 316 (FIG. 17) is secured to the cover 296. The piston rod 318 of the motor 316 has a cam 320 secured thereto that is interposed between the rollers 308 and 310. A tension spring 322 (FIG. 16), extending from the pin 306 to a pin 324 fixed to the lever 298, urges the roller 310 against the cam 320. The cam 320 has a high portion 326 that is normally interposed between the rollers 308, 310. The actuation of the motor 316 to bring a low portion 328 of the cam between the rollers will cause the spring 322 to move the roller 310, which acts as a cam follower, downwardly against the cam portion 328, swing the lever 298 clockwise, and thereby raise the hold-down foot 304, for a purpose that is explained below.

A plate 330 is secured to the cover 296 (FIG. 4). The plate 330 has indicia thereon representing various shoe sizes. A gauge bar 332 has an end located above the plate 330 and is connected at its other end to the bridge 254 (FIG. 17).

As stated above, although the apparatus of the instant invention can be used to assemble an upper on a last, and heel seat last the upper onto the insole, it has particular utility in carrying out the method disclosed in application Serial No. 80,919, filed January 5, 1961. In the referred to method, a flaccid counter coated on both of its surfaces with adhesive is inserted in a pocket formed between an upper and a liner at the heel end of the upper, the upper is draped about the last, tensioning forces are applied at the toe end of the upper to wrap the upper about the heel end of the last and initiate the molding of the counter to the shape of the last, the last is moved to a heel seat lasting position and forced upwardly against a hold-down, upward tensioning forces are applied at the toe end of the upper to assemble the upper on the last, a clamping force is applied at the heel of the last to maintain the upper stationary on the last and to complete the molding of the counter to the shape of the last, and the margins of the upper and counter are wiped down onto an insole located on the bottom of the last to thereby unite the lasted margin of the upper to the insole by adhesively bonding the counter to the upper and insole.

In setting up the machine for a particular size of last, the knobs 334 (FIG. 4), which are threaded onto the studs 236, are rotated to move the studs toward or away from each other to thereby adjust the contour of the clamping pad 238. The wheel 121 is rotated to move the side pincers 124 toward or away from each other. The wheel 38 is rotated to raise or lower the block 40 on the post 24 and thus raise or lower the upper tensioning unit 68 with respect to the rod 24 and the last pin 50 at the upper end of the rod 24. A last pin holder such as 44, having the appropriate heightwise dimension, is mounted at the top of the rod 24. The heightwise dimension of the last pin holder used is dependent on the heightwise dimension of the last.

The screw 314 is rotated to raise or lower it in the lever 298. Since the spring 322 urges the rollers 308, 310 toward each other, the heightwise movement of the screw 314 causes a corresponding heightwise movement of the clevis 312 and a raising or lowering of the hold-down foot 304. The hold-down foot should be positioned below the bottoms of the wipers 282 an amount that is dependent on the thickness of the upper margin and the counter.

The wheel 211 is rotated to move the heel seat lasting unit 176 forwardly or rearwardly in the frame 10.

Figure 6:
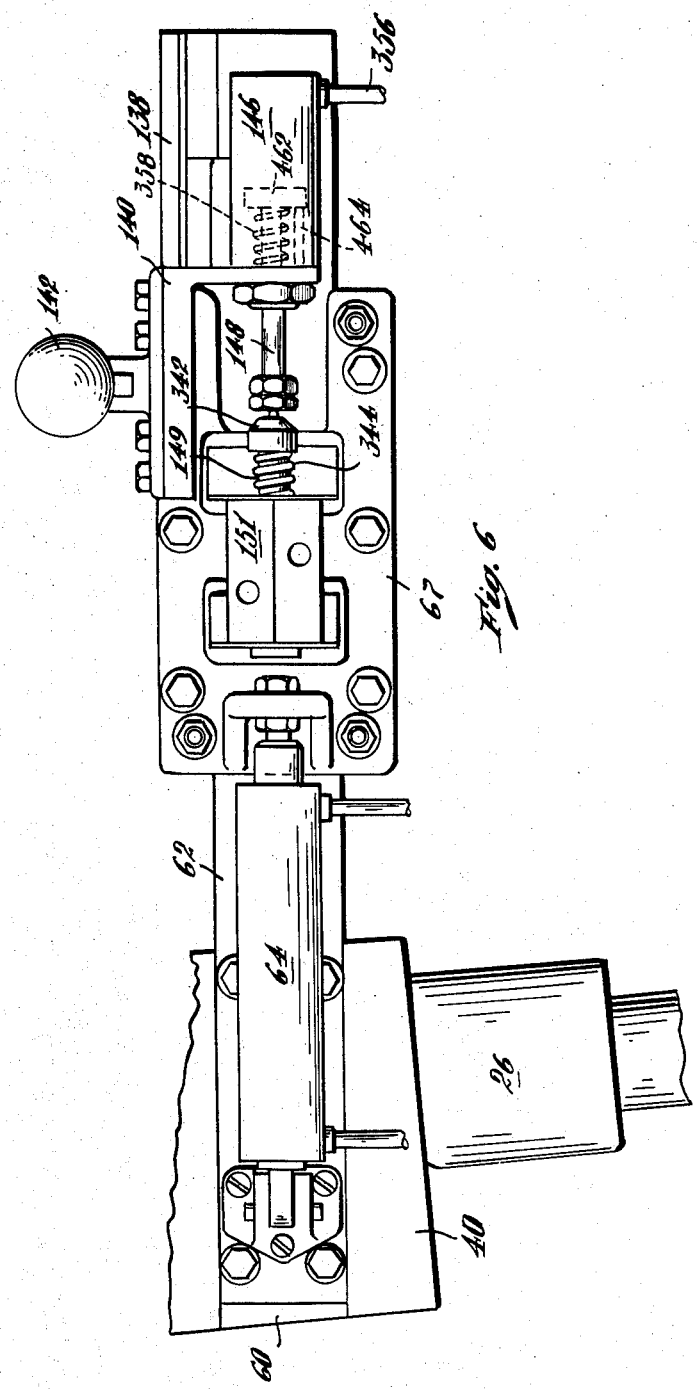
FIG. 6 is a detail of the mechanism for adjusting the upper tensioning unit along the bars on which it is slidably mounted.

The position of the bracket 140 on the shelf 138 is adjusted to correspondingly adjust the position of the upper tensioning unit 68 on the bar 62. This is accomplished in the following manner. The pilot valve 151, as shown in FIGS. 6 and 19, has a centrally located air inlet port 336 and vent ports 338 and 340 on opposite sides of the port 336. The valve spool 149 has a knob 342 at one end and a compression spring 344 is interposed between the knob 342 and the valve housing 346 to yieldably urge the valve spool against the aforementioned piston rod 148 (FIG. 6). The valve has a port 348 that is connected to one end of the motors 64 and a port 350 that is connected to the other end of the motors 64. Lands 352 and 354 on the valve spool 149 normally block the ports 348 and 350. Air normally enters the inlet port 356 of the motor 146 to extend the piston rod 148 out of the motor against the pressure of the spring 358 in the motor. Operation of the handle 142 to move the piston rod 148 away from the knob 342 causes the spring 344 to push the valve spool rightwardly (FIGS. 6 and 19) and follow the piston rod 148 and thus provide an air path between the valve ports 336 and 350 to thereby actuate the motors 64 to move the upper tensioning unit 68 along the bars 62 away from the block 40 until the piston rod 148 again moves the valve spool 149 to the FIG. 19 position. Operation of the handle 142 to move the piston rod 148 leftwardly against the knob 342 moves the knob leftwardly in the valve housing to provide an air path between the ports 336 and 348 to actuate the motors 64 to move the upper tensioning unit 68 along the bars 62 towards the block 40 until the piston rod 148 stops its leftward movement and the valve spool 149 reassumes its FIG. 19 position. Thus, movement of the bracket 140 on the shelf 138 in a given direction causes the upper tensioning unit 68 to move along the bars 62 a corresponding amount in the same direction.

Heightwise adjustment of the toe rest roller 74 (FIG. 5) is effected by a wheel 82, a shaft 81 fixed at its upper end to the wheel, a pulley 83 fixed to the lower end of the shaft, an endless belt 85 entrained about the pulley 83, and a pulley 86 fixed to a screw (not shown) which is threaded into the lower end of a post (not shown) supporting the toe rest roller 74, as described in greater detail in the aforesaid pending application.

Figure 9:
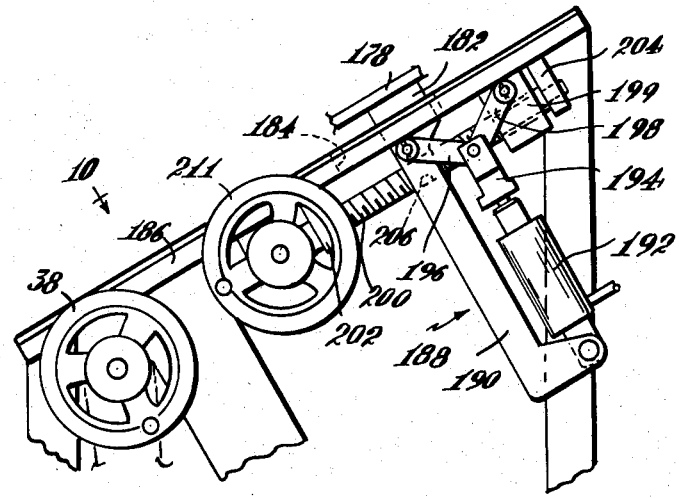
FIG. 9 is a detail of the mechanism for removing the heel seat lasting unit from its out-of-the-way position to its working position.

The rack 160 normally has its lower end in mesh with the pinion 158 so that the post 20 and the upper tensioning unit 68 are swung away from the heel seat lasting unit 176 and the holddown unit 294 as shown in FIG. 1, and the toggle linkage of the floating actuator 188 is normally in the FIG. 9 position so that the heel seat lasting unit 176 is in a rearward position in the frame 10.

A last 358 is provided having an insole 360 mounted on its bottom and an upper 362 draped thereon. A liner 364 is secured to the heel of the upper to engage the heel of the last and a counter 366 is located in the pocket formed between the upper and the liner. The last is placed bottom-up on the last-supporting plate 54 with the pin 50 entering the conventional last pin hole in the last. The toe portion of the upper and last is supported on the toe roller 74, the toe end of the upper margin is inserted between the jaws of the pincers 98, and the forepart portions of the upper margin is inserted between the jaws of the side pincers 124. At this time the upper end of the liner 364 is substantially level with the insole 360 and the upper margins of the counter 366 and upper 362 at the heel end of the last extend above the insole 360, as indicated in FIGS. 22 and 23.

An automatically operated pneumatic control system is provided to cause the machine to go through a cycle. The system is actuated by a foot-controlled pedal 368 (FIGS. 1 and 3) that is pivoted to the frame 10 by a pivot 370 and is urged clockwise about the pivot by a counterweight 372. A stop screw 374, threaded into a pedal extension 369 that extends rightwardly of the pivot 370, is engageable with a bar 376 of the frame 10 to limit the amount the pedal may move clockwise under the influence of the counterweight. A pilot valve 378 is mounted above the lever extension 369. As shown in FIG. 20, the valve 378 has an air inlet port 380 located centrally of the valve housing 382 and air vent ports 384 and 386 located adjacent the opposite ends of the housing 382. A port 388, located between the ports 380 and 384, is connected through a line 390 to the working side of the pneumatic system, and a port 392, located between the ports 380 and 386, is connected through a line 394 to the venting side of the pneumatic system. The spool 396 of the valve 378 has lands 398 and 400 which block the ports 388 and 392 when the valve spool is in neutral position. The valve spool is normally urged downwardly by a compression spring 402 interposed between the valve housing 382 and a knob 404 on the end of the spool to bring the knob to bear against the pedal extension 369. In this position, an air passage is open between an air inlet line 406, that is connected to a source of air pressure (not shown), and the line 394 leading to the venting side of the system through the ports 380 and 392. At the same time, air from the working side of the system escapes to atmosphere through the line 390 and ports 388 and 384. A movement of the valve spool 396 upwardly an amount sufficient to provide an air passage between the ports 380 and 388 causes air under pressure to enter the working side of the system through the port 388 and permits air on the venting side of the system to pass to atmosphere through the line 394 and the ports 392 and 386.

The valve spool 396 has a head 407 at its upper end that is engageable with the valve housing 382 to limit the downward movement of the valve spool in the housing. A stud 408 is slidably mounted in alignment with the valve spool 396 in a bracket 410 above the valve 378. The stud has an enlarged head 412 at its lower end that acts as a stop, and a pair of lock nuts 414 at its upper end above the bracket 410. A compression spring 416 interposed between the bracket 410 and the head 412 yieldably urges the stud 408 downwardly to a position where the lower lock nut 414 engages the bracket 410. When the operator depresses the pedal 368 to raise the valve spool 396 he will feel no resistance to the pressure exerted by his foot until the head 407 of the valve spool engages the head 412 of the stud 408. At this position of the valve spool the pneumatic system is in neutral position and all the elements controlled by the system remain in the position they were in prior to the placing of the valve in neutral position. An application of increased pressure by the operator on the pedal 368 to overcome the force of the spring 416 will place the valve spool in position to connect the working side of the system to the source of air pressure and operate the various motors controlled by the system in the below-described sequence.

As disclosed in the above-mentioned application, at any time during the operation of the machine cycle the operator may stop the machine in a particular position by releasing the pedal 368 until he no longer feels the pressure of the spring 416 and thus bring the valve spool 396 (FIG. 20) to neutral position, or by releasing the pedal entirely to bring the valve spool 396 to the venting position to return the machine to its starting position.

In accordance with this invention, the locking means is provided for holding the pedal 368 depressed when a predetermined phase of the cycle of operation of the machine is reached so as to hold the valve spool 396 in the working position and to prevent movement of the valve spool away from the working position until the cycle is completed, thus making it possible for the operator to remove his foot from the pedal without interruption of the operation of the machine. The locking means comprises a cylinder 600 fastened by a bracket 602 to the frame 10 (FIG. 2) of the machine, above the pedal 368. The cylinder 600 contains a piston rod 604 normally held retracted by a spring 606 (FIG. 21) and movable downwardly in opposition to the spring by air supplied through a conductor 608 at the upper end of the cylinder, as shown in FIGS. 2 and 21.

During the initial phase of the cycle of operation and up to the point where the end and side pincers 98 and 124 are raised heightwise of the last, the latter being held stationary by the hold-down 304 to stress the upper material heightwise of the last, it is desirable, as in the prior machine, to be able to stop the machine at any point for the purpose of inspection, or to vent the control system to return the machine to its initial position to start all over again. Accordingly, the control system for effecting sequential operation of the motor, as shown in FIG. 21, corresponds to that shown in the prior application, modified to the extent that there is means associated with the control system operable, at that phase of the cyclical operation of the machine when heightwise stressing is effected, to move the locking means into position and to hold it in position until the cycle is completed.

After the last and shoe have been positioned in the machine in the manner described above, the pedal 368 is depressed an amount sufficient to overcome the force of the spring 416 and bring the valve 378 to a position where the air line 406 is in communication with the air line 390 and the working side of the pneumatic system. Referring to FIG. 21, where the air lines in the working side of the system are drawn solid and the air lines in the venting side of the system are drawn dotted, air pressure passes from line 390 to the motors 104 and 134 to actuate them to cause the front pincers 98 and the side pincers 124 to grip the margin of the upper as indicated in FIGS. 22 and 23. If desired, additional pincers may be provided to engage the upper margin at the ball of the shoe. The additional pincers may be mounted to partake of the forward and heightwise movement of the pincers 98 and 124 described below. Alternatively, the pincers 124 may be mounted to engage the upper at the ball of the shoe. After the motors 104 and 134 have been actuated, the air passes through a sequence valve 450 to actuate a four-way pilot valve 452. The function of the sequence valve, as described in the aforesaid pending application, is to supply pressure fluid to a part of the system until a predetermined pressure is reached and then to bypass the pressure to another part of the system. The actuation of the pilot valve 452 allows air to pass from a line 454, through the valve 452 and a line 456 into a three-way pilot valve 458 to move the valve 458 from its $a$ to its $b$ position. Prior to the depression of the pedal 368 by the operator, air had flowed from the line 406, the valve 378, the line 394, a line 467, a line 526, the valve 458, the line 356 and a flow control valve 459 into the motor 146 to force the piston 462 of the motor leftwardly (FIG. 6) against a stop 464 thereby compressing the spring 358. Immediately after the depression of the pedal 368, the motors 104 and 134 were actuated, causing air to vent out of the motors 104 and 134 through a line 461 and the valve 378. The air passing through the line 461 maintains the pressure against the piston 462 by passing through the valve 458 before the spring 358 can move the piston rightwardly (FIG. 6). The flow control valve 459 slows down the egress of air from the motor 146 sufficiently to allow this to take place. The movement of the valve 458 to its $b$ position allows the air in the motor 146 to vent to atmosphere through the line 356, the valve 458, the line 460 and the valve 452. The spring 358 therefore moves the piston rod 148 rightwardly (FIG. 6) to actuate the valve 151 to cause air to enter the motors 64 through an air line 466, the valve 151 and an air line 468 in the manner described above. Actuation of the motors 64 causes the upper tensioning mechanism including the pincers 98 and 124 to move forwardly on the bars 62 to thereby horizontally stretch the upper in the direction of the toe of the last and cause a firm wrapping of the upper about the heel of the last and a tension force on the counter to start to mold it to the shape of the last.

Air pressure can now pass through a sequence valve 470 to actuate a three-way valve 472 to allow air to pass through the lines 390 and 474, the valve 472 and lines 476 and 478 to the motor 164. The motor 164 is thus actuated to lower the piston rod 166 (FIG. 7) and the rack frame 162 to thereby swing the post 20 about the pivot 22 to a position where the shoe is adjacent to but not in engagement with the heel seat lasting unit 176 and the hold-down unit 294. In this position the post 20 is in alignment with the hold-down foot 304 but the insole 360 is below the bottom of the hold-down foot. In addition, in this position, the shoe upper and last are not in engagement with the heel clamping pad 238.

The lowering of the rack frame 162 causes the lug 170 to engage the three-way valve 168 and actuate the valve to permit air to pass through the valve 168 and air line 479 to actuate a three-way pilot valve 480. The actuation of the valve 480 causes air to pass through the valve 480 and through a quick exhaust valve 482 to the motor 14 to cause the motor 14 to raise the post 20 upwardly and thus raise the last and shoe upwardly until the insole 360 bears against the hold-down foot 304. In this position the shoe and last are clamped between the hold-down foot 304 and the last-supporting plate 54, as indicated in FIG. 24, with the upwardly facing surface of the insole slightly below the top surface of the clamping pad 238 and the bottom surface of the wipers 282.

Concomitantly with the actuation of the motor 14 to raise the post 20, air pressure passes through a line 484 to a sequence valve 486. After the motor 14 is actuated, the sequence valve 486 is actuated to shift a pilot valve 488 to allow air to pass through the valve 488 to the motor 84. Actuation of the motor 84 raises the T-bar 88 to raise the pincers 98 and 124 to thereby apply an upward tension to the margin of the upper 362 at its toe and forepart portions to thereby stretch the upper tightly on the last and assemble it in proper position for the subsequent heel seat lasting operation. Since the last and shoe are clamped at this time between the foot 304 and the plate 54, upward movement of the pincers will not shift the last.

At the same time that air is being supplied to the motor 84, air is supplied through line 610 to a three-way valve 612 and from thence through the line 608 to the cylinder 600, moving the piston rod 604 therein toward the right, as seen in FIG. 21, and downwardly as seen in FIG. 2, to hold the pedal 368 depressed and hence to hold the spool 396 in the control valve 378 in working position. The cycle of operation now becomes irreversible so that the operator may remove his foot from the treadle and the successive operation which completes the cycle of operation will take place automatically, to wit, the wiper 282 will move inwardly over the margin of the upper and the hold-down 304 will be raised to allow the motor 14 to press the lasted margin into engagement with the underside of the wipers to effect bedding pressure.

After the motor 84 has been actuated, air can pass from the valve 488 through the line 490 and through a sequence valve 492 to actuate a pilot valve 494. Actuation of the pilot valve 494 causes air to pass from the line 490 through the valve 494 to the motor 192 on the floating actuator 188 to thereby raise the piston rod 194 and straighten the toggle links 196 and 198. The straightening of the toggle links moves the block 182 and the heel seat lasting unit 176 carried thereby from its normal out-of-the-way position to a position adjacent the shoe and last.

Air can now pass from the valve 494 through a sequence valve 496 to actuate a pilot valve 498. Actuation of the pilot valve 498 causes air to pass therethrough and through the lines 500 and 502 to the motors 212. Actuation of the motors 212 causes the piston rods 214 to move the levers 216 and the clamping pad 238 carried thereby toward the heel of the last with the slide 226 sliding in the gibs 234. During this movement the springs 228 and 230 maintain the lever legs 220 in abutting relation and the lever legs 222 in open position until the bight 504 engages the shoe as indicated in solid lines in FIG. 25. At this time, the bight of the pad and the slide 226 can no longer move forwardly so that continued forward movement of the piston rods 214 causes the levers 216 to swing toward each other about the pivots 224 to cause the legs 506 of the pad to move toward each other and engage the shoe as indicated in dotted lines in FIG. 25. This arrangement provides for an initial contact of the pad 238 at the heel end of the shoe and then a progressive engagement of the pad along the sides of the shoe extending forwardly of the heel to ensure a smoothening out of any wrinkles there may be in the upper and a smooth, firm clamping of the upper against the last.

Air now passes through a sequence valve 508 to actuate a three-way pilot valve 510 to allow air to pass through the valve 510 and a line 512 to the motors 248 to force the presser members 252 against the clamp pad 238 and thereby press the clamp pad against the shoe and last. As seen in FIG. 26, the presser members 252 engage the pad 238 towards the bottom of the pad opposite the portion of the last that curves inwardly to form a last portion having a relatively narrow width. The presser members 252 ensure that all of the clamp 238 bears against the last 358 to thereby hold the upper firmly in place during the subsequent lasting operation and to complete the molding of the counter 366 to the shape of the last.

Shortly after the actuation of the motors 248, air passes from the line 512 through a flow control valve 514 into the motor 256. Actuation of the motor 256 advances the piston rod 260, the rack 262 and the piston rod enlargement 276 to cause the wipers 282 to be moved from the dotted line position of FIG. 28 to the solid line position and wipe or fold the margin of the upper 362 and counter 366 down against the insole 360. The wiping pressure completes the molding of the counter and causes the counter, through the adhesive on its surfaces, to bond the wiped-in margin of the upper to the insole. The forward movement of the piston rod 260, through the links 278, causes the wipers 282 to move toward each other about the point 286. The forward movement of the piston rod 260, through the rack 262, the pinion 264, the slot 272 and the pin 274 also causes the plate 268 to move forwardly thereby providing a forward movement of the wipers as well as an inward movement about the point 286. Since the slot 272 extends normal to the path of movement of the piston rod 260, the movement of the slot from the rightward position of FIG. 14 to the leftward position indicated in phantom causes the plate 268 initially to move forwardly almost as fast as the piston rod 260 and then to gradually slow down, until, towards the end of the stroke of the piston rod, the plate has substantially no forward movement. The result of this is that initially, the wipers move forward with substantially no inward movement about the point 286, and at the end of the wiper stroke, the wipers move toward each other about the point 286 with very little forward movement. This produces a wiping action where the force created by the wipers in moving across the edge of the insole 360 at any given point is substantially radial to the curvature of the insole at that point.

During the forward stroke of the piston rod 260, the lug 289 actuates the three-way valve 292 to allow air to pass through the valve 292 to the motor 316. Actuation of the motor 316 moves the cam 320 forwardly to present the low cam portion 328 between the rollers 308, 310 and thus cause the raising of the hold-down foot 304 as indicated in FIG. 27. The motor 14 now applies upward pressure by the last directly against the wipers to provide an overwiping and bedding pressure between the wipers and the wiped-in margin of the upper during the latter part of the wiper stroke and also after the termination of the wiper stroke.

At the same time that air is supplied to the motor 316 it is supplied by a line 614 through a needle valve 616, accumulator 618 and line 620 to a sequence valve 622 which operates to shift the three-way valve 612 to a position to vent the motor 600 to the atmosphere, thus allowing the rod 604 to be retracted by the spring 606 which, in turn, allows the treadle 368 to be restored to its initial position by the counterweight 372 and the spool in the control valve 378 to move to its venting position. The accumulator 618 operates to delay venting of the motor 600 until it becomes filled with air and hence to provide a time lapse for the venting pressure. The needle valve 616 provides for adjusting the rate of delivery of air to the accumulator and hence the length of time that the bedding pressure is supplied.

This concludes the working phase in the machine cycle. As stated above, the operator may, prior to the application of the heightwise stress to the lasting margin, release his foot pressure on the pedal 368 an amount sufficient to bring the valve 378 into neutral position, in which event, the machine parts will maintain the position they have assumed at that particular time. This enables the operator to inspect the work any time he desires during the working phase of the machine cycle, and then either resume the working phase by stepping down harder on the pedal or return the machine to starting position by releasing the pedal.

Release of the pedal 368 causes air pressure to go through the valve 378 and the lines 394 and 461 to the motors 104 and 134 to open the pincers 98 and 124 and release the upper margin at the toe and forepart portions. At the same time, air pressure passes through the line 461 to the motor 84 to actuate the motor 84 to lower the T-bar 88 and the pincers 98 and 124 to their initial position. At the same time air pressure goes from the valve 378 and a line 516 to the motors 212 to actuate the motors 212 to open the clamping pad 238. At the same time air passes through the line 516 to the motor 192 to return the heel seat lasting unit 176 to its original out-of-the-way position. At the same time air passes through the line 520 to the valve 488 to return it to its original *a* position which permits air to be vented from the motor 84 through the valve 488. At the same time the valve 452 and the valve 458 are respectively caused by air pressure in a line 522 and the lines 467 and 524 to return to their original positions. The return of the valve 458 to its *a* position allows air pressure to pass through the line 526 into the motor 146 to move the piston 462 leftwardly (FIG. 6) against the pressure of the spring 358 to actuate the pilot valve 151 to operate the motors 64 to return the upper tensioning unit 68 to its original position on the bars 62. At the same time, air passing through a line 528 returns the valves 472 and 480 to their original positions.

Now a sequence valve 530 is actuated through a line 532 to actuate a pilot valve 534. Actuation of the valve 534 causes air to pass therethrough to the motor 14 to cause the motor 14 to lower the post 20 and thereby lower the last and shoe and supplies air through line 624 to the three-way valve 612 to restore it to its initial position. At the same time air flows from the valve 534 to the motor 256 to actuate the motor 256 to retract the wipers 282. At the same time air flows to the valve 510 through a line 536 to return the valve 510 to its original position. The return of the valve 510 to its original position allows the air in the motors 248 to be vented through the line 512 and the valve 510 to atmosphere and to cause the springs in these motors to return them to their original positions.

The retraction of the wipers by the rearward movement of the piston rod 260 causes the lug 289 to release the valve spool 290 and return the valve 292 to its original position and thereby allow the spring in the motor 316 to retract the piston rod 318, return the high cam portion 326 between the rollers 308 and 310 and lower the hold-down foot 304 to its original position.

Air can now pass through a sequence valve 538 to actuate a three-way pilot valve 540 to allow air to flow through the valve 540 and a line 542 to the motor 164 to cause the motor to raise the rack support 162 and thereby swing the post 20 away from the heel seat lasting unit 176 back to its original position. The raising of the rack support causes the lug 172 to move the valve 168 back to original position.

It should be understood that the present disclosure is for the purpose of illustration only and that this invention includes all modifications and equivalents which fall within the scope of the appended claims. Terms such as "heightwise," "forward," and "below" are merely indicative of the relative paths of movement and the positions of the machine parts and should be so construed.

I claim:

1. A control system for operating a plurality of fluid-actuated motors in a cycle of operation in a predetermined sequence, comprising a control valve having venting and working positions, means mounting the valve for movement from each of said positions to the other of said positions, fluid flow control means interconnecting the control valve and the motors, means operative in response to movement of said control valve to its working position to supply working fluid to the fluid flow control means to initiate a cycle of operation, means operative in response to return of the control valve to venting position to cause the motors that had been actuated to return to their initial positions, and means automatically operable, at a predetermined phase of the cycle of operation after operation of the cycle has been initiated by moving the control valve to said working position, to prevent moving the control valve away from said working position until the cycle is completed.

2. A control system for operating a plurality of fluid-actuated motors in a predetermined sequence, comprising a control valve having venting, neutral and working positions operable, respectively, to restore the system to its initial position, hold the system at a given phase of its cycle of operation and to initiate operation of the cycle, means mounting the valve for movement from each of said positions to each of the other positions, fluid flow control means interconnecting the control valve and the motors, means operative in response to movement of said control valve from its venting position through its neutral position to its working position to supply fluid to the fluid control means to initiate a cycle of operation, and means operable, at a predetermined phase in the cycle of operation after operation of the cycle has been initiated by moving the control valve to said working position, to prevent moving the valve to either its neutral or its venting position until the cycle is completed.

3. A control system for operating a plurality of fluid-actuated motors in a predetermined sequence, comprising a control valve having venting, neutral and working positions, means mounting the valve for movement from each of said positions to each of the other positions, fluid flow control means interconnecting the control valve and the motors, means operative in response to movement of said control valve to its working position to supply working fluid to the fluid control means to initiate a cycle of operation, said control valve being movable away from said working position following initiation of the cycle of operation up to a predetermined phase of the cycle of operation, to restore the system to its initial position, and means at said predetermined phase of the cycle of operation to prevent movement of the control valve away from said working position.

4. A control system for operating a plurality of fluid-actuated motors in a predetermined sequence, comprising a control valve having venting, neutral and working positions, means mounting the valve for movement from each of said positions to each of the other positions, fluid flow control means interconnecting the control valve and the motors, means operative in response to movement of said control valve to its working position to supply working fluid to the fluid control means to initiate a cycle of operation, a normally retracted locking device movable to a position to hold the control valve at said working position, and means operable, at a predetermined phase of the cycle of operation after initiation of the cycle of operation by movement of the control valve to said working position, to move the locking device into locking position and to maintain it at said position until the end of the cycle.

5. A control system for operating a plurality of fluid-actuated motors in a predetermined sequence, comprising a control valve having venting, neutral and working positions, means mounting the valve for movement from each of said positions to each of the other positions, fluid flow control means interconnecting the control valve and the motors, means operative in response to movement of said control valve to its working position to supply working fluid to the fluid control means to initiate a cycle of operation, a normally retracted locking device, a motor operably connected to the locking device for moving it into locking position to hold the control valve at said working position, and means operable, at a predetermined phase of the cycle of operation of the system, to supply fluid pressure to the motor until the cycle has been completed.

6. A control system for operating a plurality of fluid-actuated motors in a predetermined sequence, comprising a control valve having venting, neutral and working positions, fluid flow control means interconnecting the control valve and the motors, means normally holding the control valve in venting position, operator-actuatable means for moving the control valve in opposition to said last-named means through its neutral position to its working position to supply fluid pressure to the fluid control means to initiate operation of the cycle, said first-named means operating normally to restore the control valve to its venting position when said operator-actuatable means is released, and means operable, at a predetermined phase of the cyclical operation of the system after the cycle has been initiated, to render the first-named means ineffective until the cycle is completed.

7. A control system for operating a plurality of fluid-actuated motors in a predetermined sequence, comprising a control valve having venting, neutral and working positions, fluid flow control means interconnecting the control valve and the motors, means normally holding the control valve in venting position, a treadle operable to move the control valve into working position to supply fluid pressure to the fluid pressure control means to initiate operation of the cycle, said first-named means being operable normally to return the control valve to its venting position when the treadle is released, and means operable, at a predetermined phase of the cyclical operation after the cycle has been initiated, to render the first-named means ineffective until the end of the cycle.

8. A control system for operating a plurality of fluid-actuated motors in a predetermined sequence, comprising a control valve having venting, neutral and working positions, fluid flow control means interconnecting the control valve and the motors, means normally holding the control valve in venting position, a treadle movable to an operable position to move the control valve into working position to supply fluid pressure to the fluid pressure control means to initiate a cycle of operation, said first-named means being operable to return the control valve to its venting position when the treadle is released, and means operable, at a predetermined phase of the cyclical operation after the cycle has been initiated, to hold the treadle at said operative position until the end of the cycle.

9. In a pulling-over and end lasting machine wherein there is means for conforming an upper to one end and top of a last and other means for thereafter lasting the lasting margin at said end; fluid-actuated motors operable in sequence for effecting operation of said means, a control valve having an operative and an inoperative position, means mounting the valve for movement from each of said positions to the other position, fluid control means interconnecting the control valve and the motors, means operative in response to movement of said control valve from said inoperative to said operative position to actuate said fluid control means to initiate a cycle of operation, means operative in response to movement of said control valve from said operative to said inoperative position during the conforming phase of the cycle to actuate the fluid control means to stop the machine, and means operable at the conclusion of the conforming phase to render the control valve immovable from said operative to said inoperative position.

10. In a pulling-over and end lasting machine wherein there is means for conforming an upper to one end and top of a last and other means for thereafter lasting the lasting margin at said end, fluid-actuated motors operable in sequence for effecting operation of said means, a control valve having an operative and an inoperative position, means mounting the valve for movement from each of said positions to the other position, fluid control means interconnecting the control valve and the motors, means operative in response to movement of said control valve from said inoperative to said operative position to actuate said fluid control means to initiate a cycle of operation, means operative in response to movement of said control valve from said operative to said inoperative position during the conforming phase of the cycle to actuate the fluid control means to stop the machine, means operable at the conclusion of the conforming phase to prevent movement of the control valve away from its operative position, and means operable at the conclusion of the lasting phase to release said control valve.

11. In a pulling-over and heel seat lasting machine wherein there is means for conforming an upper to a last including instrumentalities for stretching the upper lengthwise and the forepart heightwise on the last, and other means for lasting the heel end of the upper including instrumentalities for clamping the heel end of the upper to the last, wiping the lasting margin inwardly against the bottom and applying bedding pressure; a plurality of fluid-actuated motors operable in a predetermined sequence, a control valve having an operative and an inoperative position, means mounting the valve for movement from each of said positions to the other position, fluid flow control means interconnecting the control valve and the motors, means operative in response to movement of said control valve from said inoperative to said operative position to actuate said fluid flow control means to initiate a cycle of operation, means operative in response to movement of said control valve from said operative to said inoperative position during the conforming phase of the cycle to actuate the fluid flow control means to stop the machine at any position of the stressing instrumentalities, and means operable at the conclusion of the conforming phase to render the control valve immovable from said operative to said inoperative position throughout the heel seat lasting phase of the cycle.

12. In a pulling-over and heel seat lasting machine wherein there is means for conforming an upper to a last including means for supporting a last in a forwardly disposed position for receiving an upper and insole, means on the support for stretching the upper lengthwise to conform the heel end thereof to the last while the latter is in said forward position, means for moving the support to a rearward position for heel seat lasting, a holddown at said rearward position, means for raising the support to engage the bottom of the shoe with the hold-down, and means for effecting heightwise movement of the forepart of the upper to conform the upper to the top of the last, and wherein there is means for lasting the heel end of the upper including means for clamping the heel end to the last, means for wiping the lasting margin inwardly against the bottom and means for applying bedding pressure to adhere the inwardly wiped margin to the insole; a plurality of fluid-actuated motors operable in predetermined sequence, a control valve having an operative and an inoperative position, means mounting the valve for movement from each of said positions to the other position, fluid flow control means interconnecting the control valve and the motors, means operative in response to movement of said control valve from said inoperative to said operative position to actuate said fluid flow control means to initiate a cycle of operation, means operative in response to movement of said control valve from said operative to said inoperative position during the conforming phase of the cycle to actuate the fluid flow control means to stop the machine at any one of the several operations which make up the conforming phase, and means operable at the conclusion of the conforming phase of the cycle to render the control valve immovable from said operative to said inoperative position until the succeeding operations which make up the heel seat lasting phase are concluded.

13. In a pulling-over and end lasting machine wherein there is means for conforming an upper to one end and top of a last and other means for thereafter lasting the lasting margin at said end, including wipers and a support for the last movable relative to each other to advance the wipers across the bottom of the last and press the bottom of the last against the wipers under bedding pressure as the concluding operation of the lasting phase, fluid-actuated motors operable, in sequence, for effecting operation of said means, a control valve having an operative and an inoperative position, means mounting the valve for movement from each of said positions to the other position, fluid control means interconnecting the control valve and the motors, means operative in response to movement of said control valve from said inoperative to said operative position to actuate said fluid control means to initiate a cycle of operation, means operative in response to movement of said control valve from said operative to said inoperative position during the conforming phase of the cycle to actuate the fluid control means to stop the machine, means operable at the conclusion of the conforming phase to prevent movement of the control valve away from its operative position, means operable at the conclusion of the lasting phase to release said control valve and means for delaying operation of the last-named means to maintain the bedding pressure for an appreciable time following movement of the wipers to their advanced position.

14. Apparatus according to claim 13, wherein the last-named means is fluid-operated and includes an adjustable valve for controlling the rate of flow of fluid thereto.

15. In a pulling-over and end lasting machine wherein there is means for conforming an upper to one end and top of a last and other means for thereafter lasting the lasting margin at said end, including wipers and a support for the last movable relative to each other to advance the wipers across the bottom of the last and press the bottom of the last against the wipers as the concluding operation of the lasting phase, fluid-actuated motors operable, in sequence, for effecting operation of said means, a control valve having an operative and an inoperative position, means mounting the valve for movement from each of said positions to the other position, fluid control means interconnecting the control valve and the motors, means operative in response to movement of said control valve from said inoperative to said operative position to actuate said fluid control means to initiate a cycle of operation, means operative in response to movement of said control valve from said operative to said inoperative position during the conforming phase of the cycle to actuate the fluid control means to stop the machine, fluid-operable means operable at the conclusion of the conforming phase to prevent movement of the control valve away from its operative position, fluid-operable means operable at the conclusion of the lasting phase to release the control valve, and an accumulator for delaying the flow of pressure fluid to said last-named fluid-operable means.

16. Apparatus according to claim 15, wherein there is an adjustable valve for controlling the rate of flow of pressure fluid to the accumulator.

17. A motor control system comprising: a plurality of fluid actuated motors; a pilot valve having a first and a second position; fluid flow control means interconnecting the valve and said motors; means operative in response to movement of said valve from said first to said second position to actuate the fluid flow control means to operate said motors in a predetermined sequence; means operative in response to movement of said valve from said second position to said first position at any particular time during said predetermined sequence to stop the operation of said flow control means and cause the motors that have been operated to return to their initial positions; manually operative means operatively connected to said valve to effect its movement from one to the other of its positions; holding means cooperative with the manually operative means to lock the manually operative means in position to maintain the valve in said second position; and means in said fluid flow control means for automatically actuating the holding means partway through said predetermined sequence.

18. A motor control system comprising: a plurality of fluid actuated motors; a pilot valve having a first, a second and a third position; fluid flow control means interconnecting the valve and said motors; means operative in response to movement of said valve from said first to said third position to actuate the fluid flow control means to operate said motors in a predetermined sequence; means operative in response to movement of the valve from said third to said second position at any particular time during said predetermined sequence to stop the operation of said flow control means and cause the motors to maintain the positions they had assumed at that time; manually operative means operatively connected to said valve to effect its movement from one to the other of its positions; holding means cooperative with the manually operative means to lock the manually operative means in position to maintain the valve in said third position; and means in said flow control means for automatically actuating the holding means partway through said predetermined sequence.

19. The system according to claim 18 further comprising: means operative in response to the movement of the valve to said first position after the valve has been moved to one of the other positions to cause the motors that have been operated to return to their initial positions.

20. A motor control system comprising: a plurality of fluid actuated motors; a pilot valve; a spool, movably mounted in said pilot valve, having a first and a second position in the valve; fluid flow control means interconnecting the valve and said motors; a manually actuable pedal in alignment with the valve spool for moving the spool from one to the other of its positions, said pedal being so located that the spool is normally located in the first position; means operative in response to movement of the spool from said first position to said second position by said pedal to actuate the fluid flow control means to operate said motors in a predetermined sequence; means operative in response to movement of the spool out of said second position by said pedal at any particular time during said predetermined sequence to stop the operation of said fluid flow control means and thereby stop the operation of the motors in said predetermined sequence; a locking member movably mounted in alignment with said pedal actuable to lock the pedal in position to maintain the spool in said second position; and means in said flow control means automatically operative partway through said predetermined sequence for automatically moving the locking member against the pedal to thereby lock the spool in said second position.

21. A motor control system comprising: a plurality of fluid actuated motors; a pilot valve; a spool, movably mounted in said pilot valve, having a lower first position and an upper second position in the valve; spring means on the valve for yieldably urging the spool downwardly into its first position; a manually actuable pedal movably mounted below the valve spool for heightwise movement from a normal position out of engagement with the valve spool to an operating position that moves the spool upwardly to its second position; means operative in response to movement of the spool from said first position to said second position by upward movement of said pedal to actuate the fluid flow control means to operate the motors in a predetermined sequence; means operative in response to movement of the spool out of said second position by downward movement of the pedal at any particular time during said predetermined sequence to stop the operation of said fluid flow control means and thereby stop the operation of said motors in said predetermined sequence; a rod mounted for movement into and out of engagement with said pedal; said rod being normally located to permit movement of the pedal to cause movement of the spool out of said second position and being adapted when moved out of normal position to lock the pedal in position to maintain the spool in said second position; a fluid actuated locking motor connected to said rod; and means in said flow control means automatically operative partway through said predetermined sequence for automatically actuating the locking motor to move the rod to lock the pedal.

22. A lasting machine comprising: a frame; wiping means movably mounted in the frame for forward and rearward movement; a first fluid actuated motor having a first piston rod operatively connected to the wiping means to effect its movement; a second fluid actuated motor supported on the frame; a second piston rod extending upwardly of said second motor; a shoe support for supporting bottom-up a last having a shoe upper and insole thereon supported by said second piston rod; a hold-down foot located above the shoe support with its bottom normally slightly below the bottom of the wiping means; a third fluid actuated motor having a third piston rod that is so connected with the hold-down foot as to normally maintain the hold-down foot in said normal position when the third piston rod is in one position and to raise said hold-down foot when the third piston rod is moved by the third motor to another position; a pilot valve having a first position and a second position; fluid flow control means interconnecting the pilot valve and said motors operative in response to movement of the pilot valve from its first position to its second position to raise the second piston rod and the shoe support carried thereby to press the insole against the hold-down foot, actuate the first motor to move the wiping means forwardly to wipe the upper margin against the insole, and, after the wiping means has commenced its forward movement, actuate the third motor to move the third piston rod to raise the hold-down foot and cause the second motor to press the upper margin against the bottom of the wiping means and apply bedding pressure thereto, said fluid flow control means being operative in response to the return of the pilot valve to its first position to lower the second piston rod and the shoe support carried thereby, actuate the first motor to return the wiping means to its original position, and actuate the third motor to return the hold-down foot to its normal position; a fourth fluid actuated motor operative when actuated to return the pilot valve to its first position; and time delay means in said fluid flow control means operative to actuate said fourth motor a predetermined time after the third motor has been actuated to raise the hold-down foot.

23. The lasting machine according to claim 22 wherein said time delay means comprises: a fluid line extending between the third motor and the fourth motor; and an accumulator interposed in said line.

24. The lasting machine according to claim 23 wherein said time delay means further comprises: an adjustable valve in said line between the third motor and the accumulator.

25. A lasting machine comprising: wiping means mounted for forward and rearward movement; a first motor operably connected to the wiping means to effect its movement; a shoe support mounted for heightwise movement adjacent the wiping means for supporting bottom-up a last having a shoe upper and insole thereon; a second motor operably connected to the shoe support to effect its movement; a hold-down foot located above the shoe support with its bottom slightly below the bottom of the wiping means; a third motor operably connected to the hold-down foot to normally maintain it in said normal position but actuable to raise it from its normal position; a pilot member having a first position and a second position; control means interconnecting the pilot member and said motors operative in response to movement of the pilot member from its first position to its second position to actuate the second motor to raise the shoe support to press the insole against the hold-down foot, actuate the first motor to move the wiping means forwardly to wipe the upper margin against the insole, and, after the wiping means has commenced its forward movement, actuate the third motor to raise the hold-down foot and cause the second motor to press the wiper upper margin against the bottom of the wiping means and apply bedding pressure thereto, said control means being operative in response to the return of the pilot member to its first position to cause the second motor to lower the shoe support, cause the first motor to return the wiping means to its original position, and actuate the third motor to return the hold-down foot to is normal position; a fourth motor operative when actuated to return the pilot member to its first position; and time delay means in said control means operative to actuate said fourth motor a predetermined time after the third motor has been actuated to raise the hold-down foot.

References Cited in the file of this patent
UNITED STATES PATENTS

| | | |
|---|---|---|
| 2,423,454 | Jorgensen | July 8, 1947 |
| 2,874,392 | Campione | Feb. 24, 1959 |